United States Patent
Schreib et al.

(10) Patent No.: US 6,301,236 B1
(45) Date of Patent: Oct. 9, 2001

(54) TRANSMISSION MEANS

(75) Inventors: Franz Schreib, München; Michael Färber, Wolfratshausen, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/077,706

(22) PCT Filed: Nov. 22, 1996

(86) PCT No.: PCT/DE96/02249

§ 371 Date: Jun. 5, 1998

§ 102(e) Date: Jun. 5, 1998

(87) PCT Pub. No.: WO97/22187

PCT Pub. Date: Jun. 19, 1997

(30) Foreign Application Priority Data

Dec. 13, 1995 (DE) ............................................ 195 46 599

(51) Int. Cl.$^7$ ........................................................ H04B 15/00
(52) U.S. Cl. ........................ 370/334; 370/345; 455/101; 375/267
(58) Field of Search ................................ 455/63, 65, 101; 370/314, 328, 334, 336, 345; 375/267

(56) References Cited

U.S. PATENT DOCUMENTS

| | | | |
|---|---|---|---|
| Re. 36,591 | * 1/1999 | Hayashi | 370/342 |
| 3,945,013 | * 3/1976 | Brunner | 343/708 |
| 5,339,086 | * 8/1994 | DeLuca | 342/371 |
| 5,689,439 | * 11/1997 | Weerackody | 364/514 |
| 5,710,977 | * 1/1998 | Nakazawa | 455/65 |
| 6,006,075 | * 12/1999 | Smith | 455/101 |

* cited by examiner

Primary Examiner—Hassan Kizou
Assistant Examiner—Roberta Stevens
(74) Attorney, Agent, or Firm—Schiff Hardin & Waite

(57) ABSTRACT

A transmission, without modification of the transmission frequency, switches over the radiation characteristic for the radio signals corresponding to the time protocol of the message transmission, and the chronologically successive radio signals of a traffic relation are decorrelated to one another. In this way, the signal extinguishing that arises in a receiver due to multipath propagation can be reduced. The transmission apparatus is in particular constructed as a base station in GSM mobile radiotelephone networks.

8 Claims, 3 Drawing Sheets

TRANSMISSION MEANS

BACKGROUND OF THE INVENTION

The invention relates to a transmission means with a transmission signal source and a transmission antenna for the radiation of radio signals of a determined transmission frequency according to a predetermined time protocol.

In radio systems, such as e.g. the GSM mobile radiotelephone system, transmission means are used for the radiation of radio signals as electromagnetic waves that are recorded and evaluated by receiving means. There are thus no line-bound connections between the transmission means and the receiving means. In the transmission means, the transmission signals are produced in a transmission signal source; these transmission signals are thereby at radio frequency. Via cable connections and various further means such as preamplifiers, etc., the transmission signals are supplied to a transmission antenna, which finally radiates the radio signals.

A transmission antenna thereby comprises a particular radiation characteristic. Under real conditions of use for radio systems, the radio signals are exposed to a wide variety of disturbances, and reach the receiver means via very different propagation paths. Besides a direct propagation path, the radio signals can also be reflected or bent at obstacles such as mountains, trees, buildings, etc. In the receiver means, the radio signals from the various propagation paths are superposed. This leads to extinguishing effects, which sometimes have a strong adverse effect on the reception of the radio signals; on this, see J. D. Parsons, "The Mobile Radio Propagation Channel," Pentech Press Publishers, London, 1992, pp. 108–113.

In order to circumvent these extinguishing effects, also called fading effects, various methods are known. With several receiving antennas in the direction of reception, it is for example possible to reduce the extinguishing effect by means of antenna diversity. In addition, from the GSM mobile radiotelephone system it is known to effect an improvement of the reception conditions via frequency hopping, i.e. to change the transmission frequency for the transmission signals (M. Mouly, M. B. Pautet, "The GSM System for Mobile Communications," 1992, i.a. pp. 218–223). However, the latter method has the disadvantage that it requires an expensive implementation. Also, it cannot be used if only one carrier frequency is available in the GSM mobile radiotelephone system, as is the case above all in simple and economical base stations.

From Prior art references EP-A-0 479 744, WO-A-95/32558, and GB-A-2 221 820, communication systems are known in which switching takes place between different antennas during a connection. These antennas can also comprise a different polarizations. In addition, in International reference WO-A-95/32558, the changeover is synchronized with a time protocol of the transmission.

In addition, the problem of strong fluctuations in signal level at the receiver can be compensated by increasing the transmission power. However, this has the disadvantage that increased disturbances must be reckoned with on adjacent radio paths.

SUMMARY OF THE INVENTION

The invention is thus based on the object of effecting a reduction of the extinction effect in radio paths between transmission means and receiver means in radio systems even if only one transmission frequency is available.

The basic idea of the invention is the use of a further dimension of the modification of the radiation diagram of the transmission means. On the transmission side of the radio path, by means of a time-controlled changeover switch the radiation characteristic of the transmission means is switched in such a way that for a sequence of information to be transmitted, at least two different decorrelated radio signals containing different items of information, with different radiation characteristics, arise successively, e.g. in successive time slots of a traffic relation, corresponding to a time protocol of the message transmission of the transmission means. The transmission frequency is thereby not modified.

Besides a further possible decorrelation of the channel condition by means of frequency modification, according to the invention an additional decorrelation of the channel condition can be achieved by means of the different radiation characteristic. If the transmission means does not have the possibility of carrying out a frequency modification, then for the first time the possibility of the decorrelation of radio signals on the transmission side is achieved.

If the communication system in whose context the transmission means is used is a communication system operated in time-slot multiplexing, the changeover switch is advantageously controlled by a timing element that changes over the radiation characteristic in accordance with the time slots, according to a predeterminable sequence. Examples of such communication systems operated in time-slot multiplexing include the GSM mobile radiotelephone system and the DECT wireless telephone system.

In order to influence the radiation characteristic of the transmission means without changing the frequency, it is possible to provide further transmission antennas, to realize radiation in different polarization planes, or also to modify the direction of radiation of the transmission antenna. These three measures can of course also be combined with one another.

If at least one further transmission antenna is provided, the changeover switch switches the transmission signals between the transmission antennas. If the one transmission antenna enables radiation in different polarization planes, then the changeover switch switches to the transmission antenna in such a way that a changeover takes place between the polarization planes. For the modification of the direction of radiation, the transmission antenna is advantageously marked as a phase-controlled group antenna, so that the changeover switch carries out the phase controlling of the group antenna in such a way that a changeover takes place between at least two different radiation characteristics.

Corresponding to a further embodiment of the invention, the transmission means is constructed as a mobile station or as a base station inside a GSM mobile radiotelephone network. The time protocol in the transmission means thus decides between time slots inside a frame, whereby frames can in turn be combined to form macroframes. The changeover switch thus switches over the radiation characteristic of the transmission means with each time slot, each frame or macroframe, in a manner conforming to the time slots. There are thus no disturbances in the message transmission.

The changeover, for example between different transmission antennas, takes place according to a freely determinable sequence, i.e., all existing transmission antennas can be driven successively, or can be driven according to another advantageous pattern. Different methods can thereby be used to achieve a statistical decorrelation of the radio signals. Advantageously, the transmission means for the case of several transmission antennas is constructed in such a way that the transmission antennas are positioned with respect to one another in such a way that in predetermined regions of the radio range of the transmission means, the radio signals with the different radiation characteristics comprise a least decorrelation. Particular problem regions in the radio range, e.g. tunnel interiors or the like, can thereby be taken specifically into account in the positioning of the transmission antennas. The effectiveness of the inventive transmission means can be concentrated on these problem areas, with respect to the equalization of the fluctuations of the transmission level at the receiver means.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which.

DESCRIPTION OF THE PREFERRED EMBODIMENTS

Figure 1:
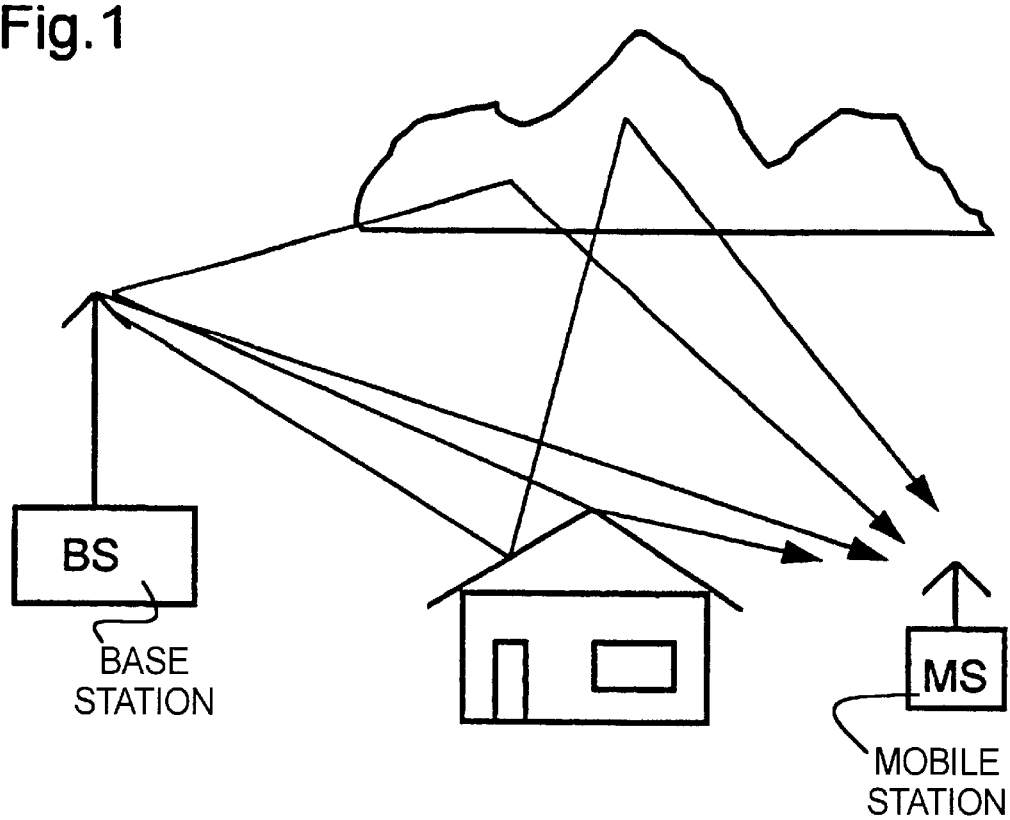
FIG. 1 shows an environment of use typical for a GSM mobile radiotelephone system, characterized by multipath propagation.

FIG. 1 explains the environment of use of a radio system, e.g. of a GSM mobile radiotelephone system (GSM, DCS1800, PCS1900). A base station BS, as a transmission means, is supposed to radiate radio signals to a mobile station MS for message transmission, which signals are then received by the mobile station MS. For this purpose, a traffic relation is set up between the base station BS and the mobile station MS until the end of the message transmission; however, for radio systems operating in time-division multiplexing, items of information are actually transmitted for this traffic relation only during certain time slots. However, besides the base station BS and the mobile station MS, further active or passive components in the radio range of the base station BS are also to be taken into account. These are sketched as a house or a mountain. The radio signals emanated by the base station BS reach the mobile station MS via various propagation paths. This is the classic case of multipath propagation, which results from single or multiple reflections, or from bendings, but also from the direct propagation path.

Figure 2:
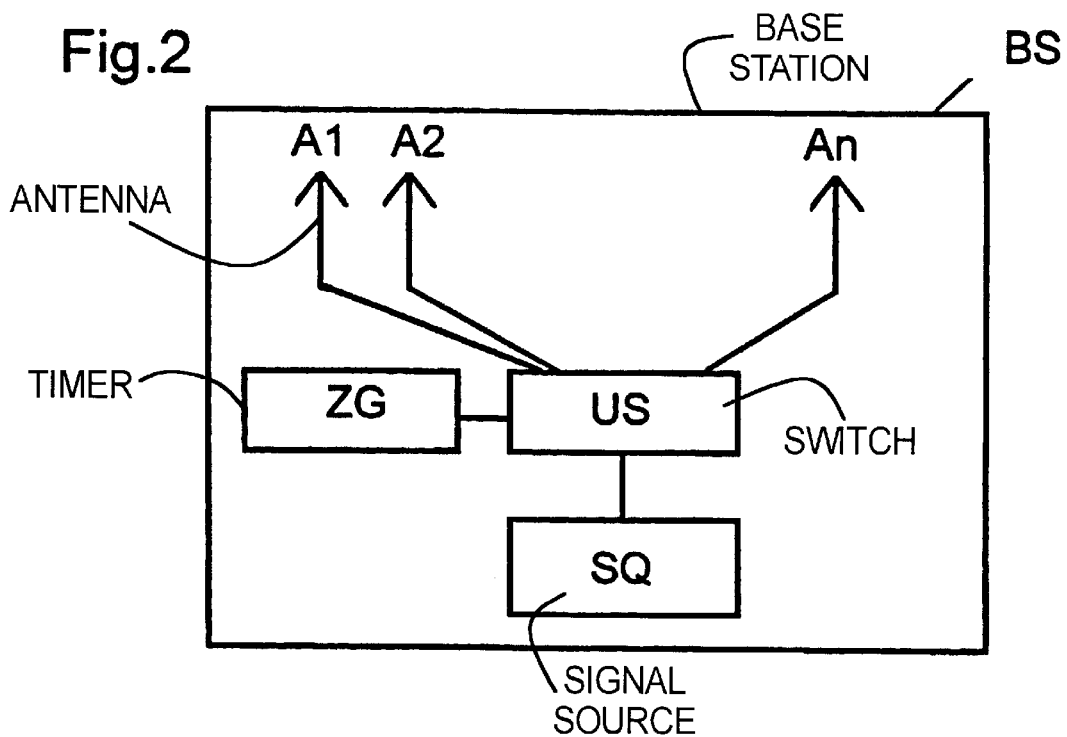
FIG. 2 shows a base station with several transmission antennas.

FIG. 2 shows a base station BS that for the reduction of the extinguishing effects that arise at the mobile station MS by means of the superposition of the radio signals of the various propagation paths, via the use of several transmission antennas A1 . . . n. The transmission means functional part of the base station BS comprises according to the invention a transmission signal source SQ that is connected with a changeover switch US. The changeover switch US is controlled by a timing element ZG corresponding to the time protocol of the GSM mobile radiotelephone system. The changeover switch US switches the transmission signals that are produced in the transmission signal source SQ to the various transmission antennas A1 . . . n. Each transmission antenna A1 . . . n thereby has an individual radiation diagram that differs from the others. There thus results for each of these radiation diagrams (radiation characteristics) a characteristic scenario with respect to the multipath propagation. This has the advantage that by changing over between two radiation characteristics the extinguishing effects at the mobile station MS can be modified and reduced if warranted. If the changeover between the transmission antennas A1 . . . n in the base station BS takes place independent of acknowledgments from the mobile station MS, a statistical improvement can nonetheless be achieved. However, in the base station BS it can also be achieved that, dependent on the result of the reception in the mobile station MS, the changeover of the radiation characteristic is used to improve the reception results.

Figure 3:
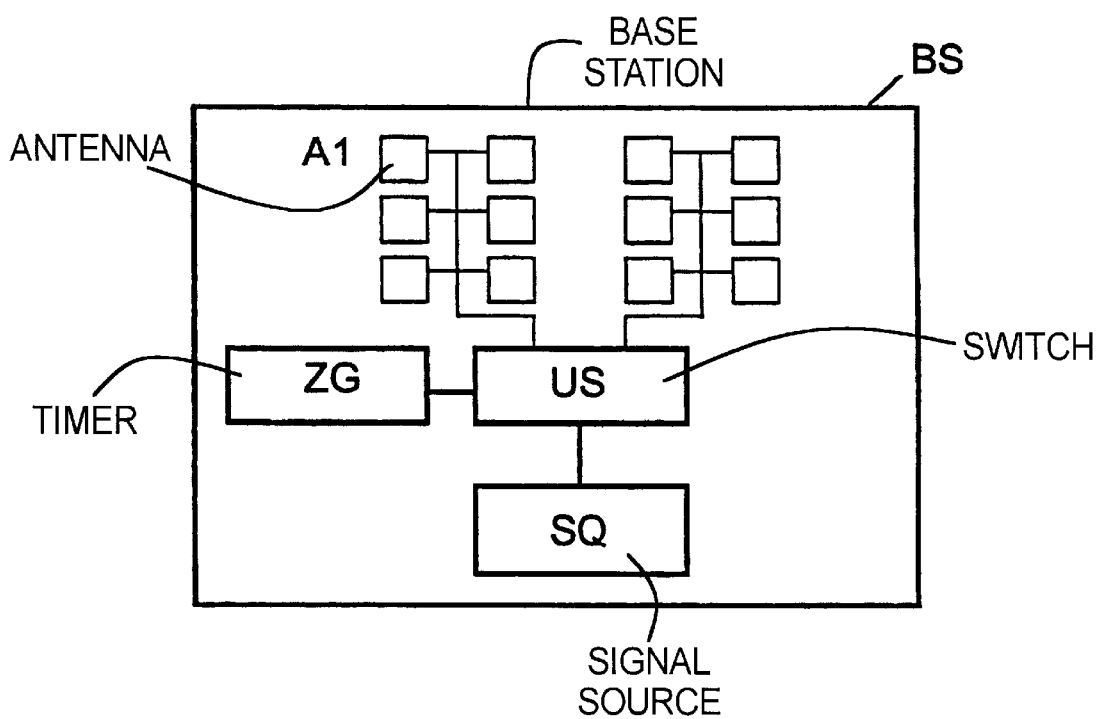
FIG. 3 shows a base station with a group antenna for switching over the direction of polarization or, respectively, the direction of propagation.

FIG. 3 shows a base station BS that again comprises a transmission signal source SQ, a changeover switch US, and a timing element ZG, as described previously. However, the changeover switch US is not connected with several transmission antennas A1 . . . n, but rather with only one transmission antenna A1, fashioned as a group antenna. The individual elements of the group antenna A1 can be controlled by the changeover switch US, according to known methods of phase controlling, in such a way that the radiation characteristic of the transmission antenna A1 changes by means of modification of the polarization of the radio signals or by means of modification of the direction of radiation of the radio signals. In this way, there results a new scenario for the propagation paths of the radio signals. In the base station BS according to FIG. 3 as well, the decorrelation of the radio signals of the various radio signals is achieved without frequency modification.

The adjustment of the radiation diagrams can advantageously take place in such a way that in certain regions of the radio range of the base stations BS a particularly high decorrelation is realized. This decorrelation is above a particular least value. This specific adjustment is however not a condition, since a statistical reduction of the extinguishing effects can also be achieved at the mobile station MS by means of a purely statistical random discrimination of the radiation characteristics.

Figure 4:
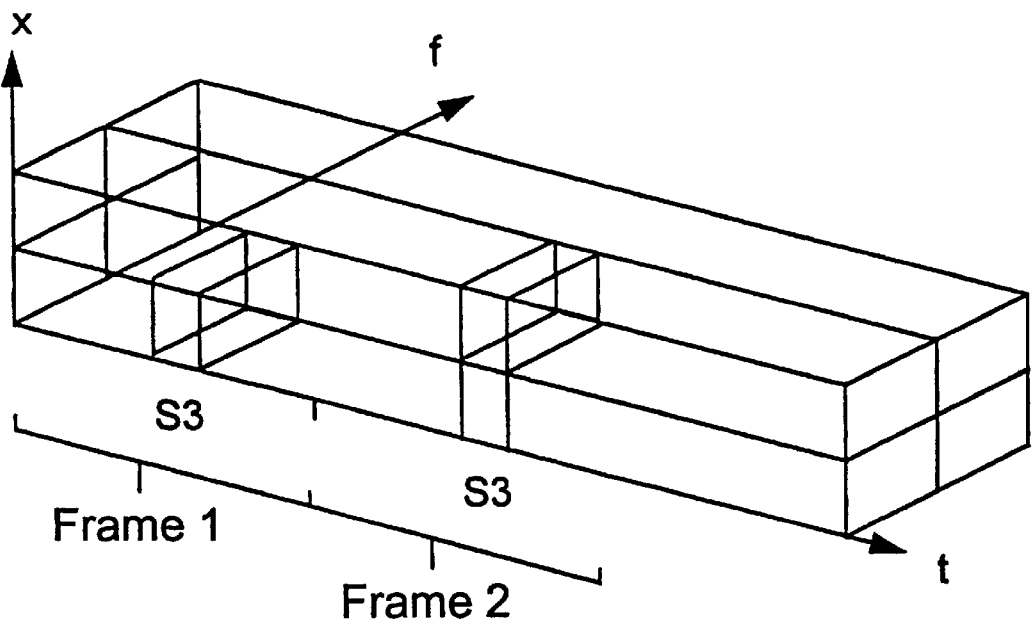
FIG. 4 shows a time diagram of the use of time slots for message transmission without frequency hopping.

FIG. 4 explains, via a spatial diagram with axes time t, frequency f and x for the additional dimension:
 additional transmission antenna,
 additional polarization planes,
 additional direction of radiation, the possibilities of message transmission via a radio path.

The message transmission takes place in the GSM mobile radiotelephone network in time-division multiplexing, and also in frequency multiplexing if several carrier frequencies are provided. A time slot, e.g. time slot S3, is allocated to a traffic relation between the base station BS and the mobile station MS. In each frame (frame 1, frame 2, . . . ), this time slot S3 is used for message transmission between the base station BS and the mobile station MS. However, according to the invention, the dimension frequency f is not used to achieve a decorrelation of the channel conditions; rather, the above-named dimension x is used.

Figure 5:
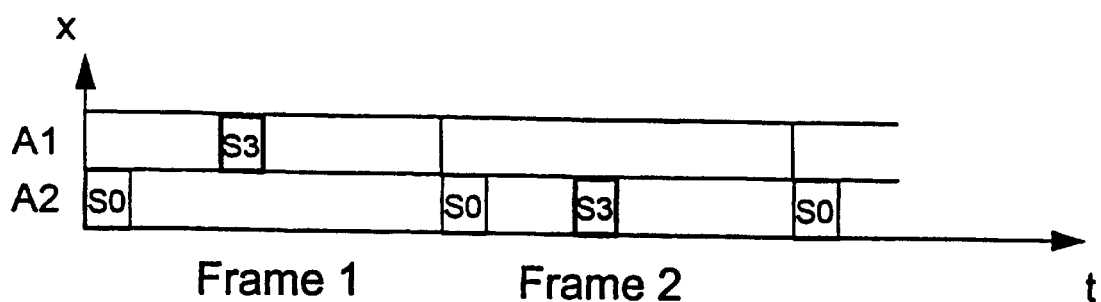
FIG. 5 shows time diagrams of the time protocol of the changeover switch.
Figure 5:
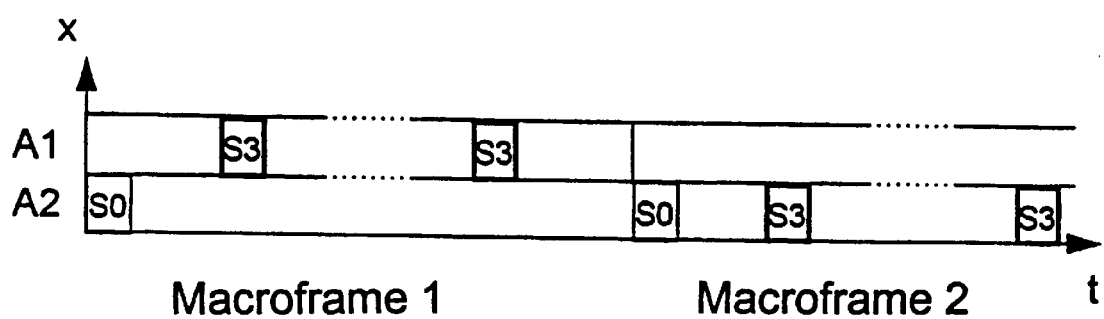

In FIG. 5, it is explained that the changeover of the transmission signals, e.g. from a transmission antenna A1 to a transmission antenna A2 for a time slot S3, can take place from frame to frame, or also remains constant within a macroframe; however, a changeover from macroframe 1 to macroframe 2 takes place.

In addition, it is to be noted that the changeover for different traffic relations that occupy one of the time slots S0 . . . 7 can also take place from time slot to time slot.

The inventive transmission means BS, MS makes it possible, even if only one transmission frequency is available, to decorrelate the channel conditions for radio signals into time slots belonging to a traffic relation; in this way, improved call conditions result, for example in GSM mobile radiotelephone systems. If only a single carrier is provided, i.e. a transmission frequency in the transmission direction BS, MS, then the dimension x provides the only possibility for the decorrelation of the channel conditions in successive time slots.

The inventive construction for decorrelating the channel conditions via the variants indicated in the dimension x can of course also be combined with frequency hopping. In this way, there results a further improvement of the reception conditions, since for example there are four decorrelated channel conditions, given two antennas and two carrier frequencies.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A transmission apparatus for a mobile radiotelephone network, the transmission apparatus having a transmission signal source, comprising:

a predetermined transmission antenna for transmission of information sequences that are partitioned according to a predetermined time protocol and that are radiated in at least two radio signals with a determined transmission frequency, containing different items of information;

a time-controlled changeover switch that switches, in a predeterminable sequence, the radiation characteristic of the transmission apparatus so that without modification of the transmission frequency, successive radio signals of a traffic relation are decorrelated, whereby a time protocol of the time-controlled changeover switch is synchronized with a time protocol of message transmission of the transmission apparatus, switching over of the radiation characteristic being carried out via the transmission antenna, whereby the direction of radiation is modified; and the transmission antenna operatively connected to the transmission signal source via the changeover switch.

2. The transmission apparatus according to claim 1, wherein radio signals are formed in the transmission apparatus, which is operated in time-slot multiplexing, and are radiated, and wherein the changeover switch is controlled by a timing element so that the changeover switch switches over the radiation characteristic corresponding to a predeterminable sequence, in conformance with the time slots.

3. The transmission apparatus according to claim 1, wherein at least one further transmission antenna is provided for transmission, and wherein the changeover switch switches the transmission signals to different transmitting antennas of the predetermined transmission antenna and the at least one further transmission antenna.

4. The transmission apparatus according to claim 1, wherein at least one transmission antenna of the predetermined transmission antenna and at least one further transmission antenna such that radiation can take place in different polarization planes, and wherein the changeover switch supplies transmission signals to the at least one transmission antenna of the predetermined transmission antenna and the at least one further transmission antenna such that changeover takes place between the polarization planes by means of suitable feeding of the at least one transmission antenna of the predetermined transmission antenna and the at least one further transmission antenna.

5. The transmission apparatus according to claim 1, wherein at least one transmission antenna of the predetermined transmission antenna and at least one further transmission antenna is marked as a phase-controlled group antenna, and wherein the changeover switch switches over or controls phase controlling between at least two different radiation characteristics.

6. The transmission apparatus according to claim 2, wherein the transmission apparatus is one of a base station or mobile station in a GSM or GSM-similar mobile radiotelephone system, and wherein with each of one of a time slot, frame or macroframe the changeover switch switches over the radiation characteristic in accordance with GSM.

7. The transmission apparatus according to claim 3, wherein relative position of the transmission antennas of the predetermined transmission antenna and the at least one further transmission antenna to one another in a direction of transmission is determined such that in predetermined regions within a radio range of the transmission apparatus free space transmission signals of various radiation characteristics comprise a least decorrelation.

8. The transmission apparatus according to claim 1, wherein frequency modification is provided in the transmission apparatus.

\* \* \* \* \*